United States Patent [19]

Manico et al.

[11] Patent Number: 5,747,225
[45] Date of Patent: May 5, 1998

[54] LIGHT SENSITIVE DEVICE

[75] Inventors: Joseph Anthony Manico, Rochester; Richard Carroll Reem, Hilton, both of N.Y.

[73] Assignee: Eastman Kodak Company, Rochester, N.Y.

[21] Appl. No.: 580,733

[22] Filed: Dec. 27, 1995

[51] Int. Cl.⁶ .................. G03B 17/18; G03C 1/685; G03C 1/73
[52] U.S. Cl. .................. 430/345; 430/19; 430/338; 430/962; 396/6; 396/291; 396/287; 396/201; 250/474.1; 250/482.1
[58] Field of Search .................. 430/19, 962, 338, 430/345; 354/471; 396/6, 287, 291, 201; 250/474.1, 482.1

[56] References Cited

U.S. PATENT DOCUMENTS

| | | | |
|---|---|---|---|
| 3,270,639 | 9/1966 | Windsor et al. | 354/411 |
| 3,291,604 | 12/1966 | Michel et al. | |
| 3,697,604 | 10/1972 | Hall et al. | 568/817 |
| 3,705,918 | 12/1972 | Hall et al. | 558/429 |
| 4,130,760 | 12/1978 | Fanselow et al. | |
| 4,804,992 | 2/1989 | Moriyama et al. | |
| 5,166,345 | 11/1992 | Akashi et al. | |
| 5,387,798 | 2/1995 | Funakoshi | 250/474.1 |
| 5,532,104 | 7/1996 | Goto | 430/139 |
| 5,555,046 | 9/1996 | Meyerhoefer | |

FOREIGN PATENT DOCUMENTS

| | | |
|---|---|---|
| 63-027586 | 2/1988 | Japan . |
| 63-196673 | 8/1988 | Japan . |
| 63-296872 | 12/1988 | Japan . |
| 1-011185 | 1/1989 | Japan . |
| 1-038283 | 2/1989 | Japan . |
| 4-213029 | 8/1992 | Japan . |
| 4-213031 | 8/1992 | Japan . |
| 5-142700 | 6/1993 | Japan . |
| 7-159877 | 6/1995 | Japan . |
| 1186987 | 4/1970 | United Kingdom . |

OTHER PUBLICATIONS

Derwent Publications Ltd., (JP 63 027 586) May 1988, p. 5/597.
Patent Abstracts of Japan (JP 04 213031), Nov. 1992, vol. 016, No. 559, p. 1455.

*Primary Examiner*—John A. McPherson
*Attorney, Agent, or Firm*—Paul A. Leipold

[57] ABSTRACT

The invention relates to a light sensing device comprising a spironaphthoxazine dispersed in a layer of gelatin on a base material.

30 Claims, 2 Drawing Sheets

LIGHT SENSITIVE DEVICE

FIELD OF THE INVENTION

The invention relates to a device for visually indicating light intensity. The invention particularly relates to devices for sensing when a flash is needed to expose photographic film.

BACKGROUND OF THE INVENTION

Expensive electronic flash cameras have a light meter or other exposure measuring device contained within the camera which senses the amount of ambient light present for the scene being photographed and automatically fires the flash assembly if the sensed lighting conditions will not produce an effective exposure.

In a number of more inexpensive cameras, such as one time use or single use cameras manufactured by the Eastman Kodak Company and Fuji Photo Film Co., Ltd., the flash assembly is manually operated, typically by an actuable switch located on the exterior of the camera body which charges the flash assembly for firing when the shutter release button is depressed. Prior to capturing an image, the average user must make a decision, gauged on the amount of ambient lighting perceived visually by the user, whether or not to charge the flash assembly. Improper decisions regarding the use of the flash may subsequently produce inconsistent results, resulting in consumer dissatisfaction.

In some other instances, such as when there is indoor lighting, the user should be guided or reminded to activate the flash prior to image capture given that a high percentage of pictures taken under these conditions require flash.

The Japanese Kokai 4-213031 published Aug. 4, 1992, describes a photosensitive unit and a reference unit arranged on a one time use camera. The photosensitive unit comprises a photochromic material which changes hue when incident UV radiation strikes the material. A color of the photosensitive unit is compared to the color of the reference unit to measure illuminance and to thereby determine whether the camera should be operated.

Japanese Kokai 4-213029 published Aug. 4, 1992, describes a UV-sensitivity unit which is used with a reference unit. The reference unit is a ring which the user wears and upon its efficient illumination, the UV sensitive unit changes color for comparison to the reference unit.

U.S. Pat. No. 4,804,992 describes an indicating member for a camera viewfinder which can include a photochromic material which provides a visual indicator that an improper exposure would result depending on a particular scene brightness.

Japanese Kokai 5-142700 published Jun. 11, 1993, describes the use of a photochromic material on a single use camera which can alternately be used as a light brightness detector or a lens filter depending on the location of the material.

Japanese patent application 63-196673, JP 01-038283, JP 63-296871, and JP 01-011185 disclose disappearing inks or paints. Spirooxazines are disclosed as photochromic materials.

Problem to be Solved by the Invention

There remains a need for a system that would change color so effectively that no difficult reference measurement was necessary. Further, there remains a need for a photographic sunlight sensor that does not require a difficult hue comparison by the casual user of a camera.

SUMMARY OF THE INVENTION

An object of the invention is to provide improved picture taking with single use cameras.

Another object of the invention is to provide a way for the user to have appropriate flash use on a single use camera.

These and other objects of the invention are generally accomplished by providing a light sensitive device comprising photochromic chemicals dispersed in hydrophilic colloid.

In a preferred embodiment the light sensing device comprises spironaphthoxazine dispersed in a layer of gelatin.

Advantageous Effect of the Invention

The invention has numerous advantages over prior sunlight sensors. The sensors of the invention shift at the desired amount of light for exposing photographic film in a single use camera. Further, the invention light sensors provide a clear change from one color to another completely different color in a very short time. The change of the indicator device is so rapid that the user of a camera is not inconvenienced waiting to find out whether or not a flash is required to take a photograph. Further, the devices of the invention are easily formed and flexible. Another advantage of the instant invention sunlight sensors is that they do not show fatigue and are able to accurately indicate exposure to light after multiple uses. These and other advantages will be clear from the description below.

DETAILED DESCRIPTION OF THE INVENTION

The invention provides an element that will change color rapidly and dramatically when exposed to an amount of sunlight that will result in satisfactory photographic exposure. The elements of the invention generally are resistant to abuse and stable over the range of conditions that a camera, particularly a one time use camera, is subjected to.

Figure 1:
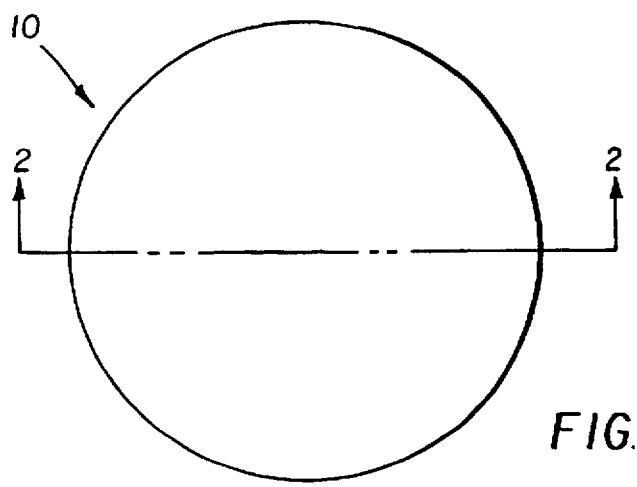
FIG. 1 is a view of an element in accordance with the invention.

FIG. 1 is a top view of a circular indicator element in accordance with the invention.

Figure 2:
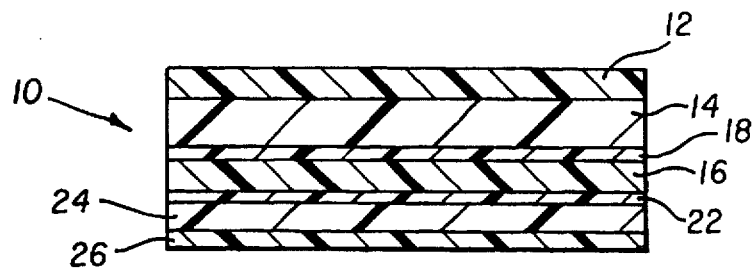
FIG. 2 is a cross-sectional view on line 2—2 of FIG. 1 of an element of the invention.

FIG. 2 is a view of element 10 along the cross section of line 2—2. The element comprises an upper hardened transparent layer 12 and layer 14 which is the photoactive layer that will change color upon exposure to sunlight. Base paper layer 16 has been provided with waterproofing coats of polymer 18 and 22. The element as shown in FIG. 2 also is provided with an adhesive layer 24 which is shown as covered with a removable paper 26. Such paper would be removed and the element of the invention fastened to a suitable substrate such as a disposable camera by adhesive layer 24. The preferred material for layers 12 and 14 is a hydrophilic colloid, such as gelatin, as it allows rapid reaction of the photochromic compounds of the invention which are dispersed in gelatin layer 14. Layer 12 generally is a hydrophilic colloid with cross-linking agents to form a hard surface. Layer 12 is not required for the invention, but it is advisable to have a hardened protective layer to improve the wear properties of the invention element.

Figure 3:
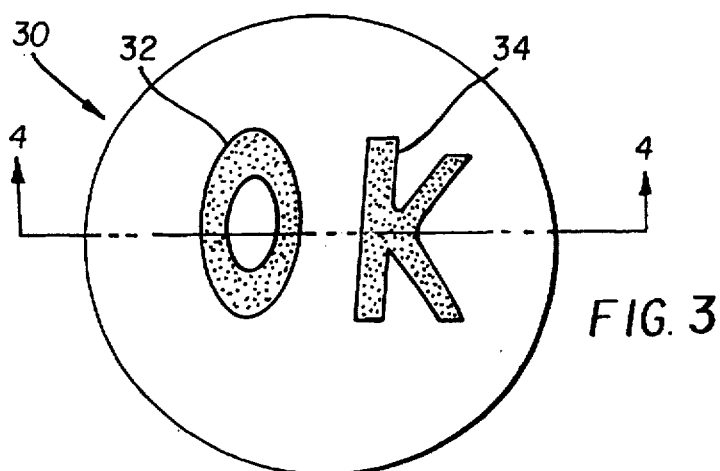
FIG. 3 is a top view of an element in accordance with the invention having an ultraviolet light-absorbing layer
Figure 4:
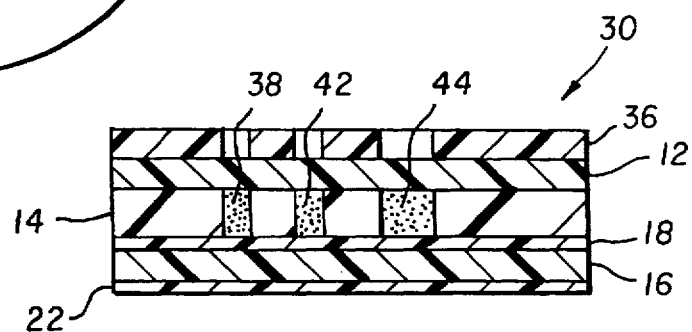
FIG. 4 is a cross-sectional view on line 4—4 of FIG. 3.

The element of the invention 30 shown in FIG. 3 has been divided with indicias 32 and 34 which provide a visual message that may be read when the element is exposed to sunlight. The element as shown in FIG. 3 has been exposed to the sun causing 32 and 34 to become dark. A cross-sectional view of element 30 on line 4—4 is shown in FIG. 4. As shown therein, the element comprises an ultraviolet light absorbing layer 36, a hardened gelatin layer or other hydrophilic colloid 12. Ultraviolet absorbing 36 layer overlays the photochromic layer 14 and is between the photochromic layer 14 and the upper side exposed to the light and away from the base 16. Layer 14 containing the photochrome material such as spironaththoxazine of the invention has changed color in areas 38, 42, and 44 where the indicia 32 and 34 have been exposed to the ultraviolet rays of sunlight through the breaks in layer 36. The base paper is the same as element 10. Element 30 is not provided with an integral adhesive coating and in use would be applied by a separate adhesive.

Figure 5:
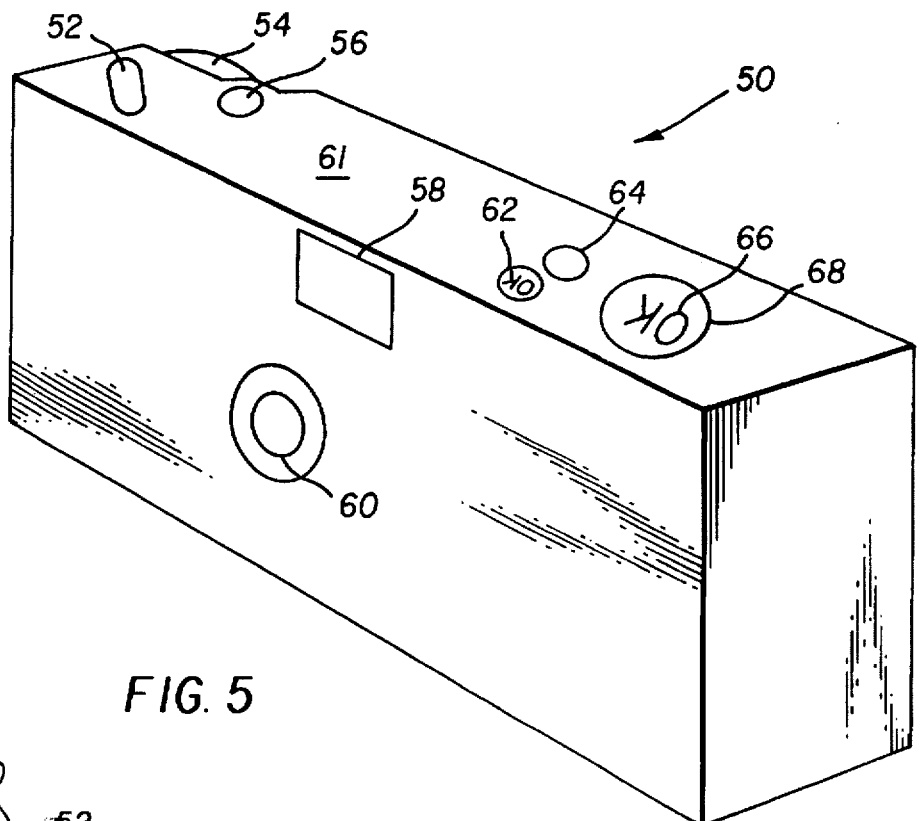
FIG. 5 is a perspective view of a camera using an element of the invention.

FIG. 5 illustrates a single use camera 50. The camera 50 is provided with a shutter release button 52, film advance wheel 54, and a film frame counter 56. Lens 60 is on the front of the camera, as is the viewfinder 58. Placed on the top 61 of the camera are three indicators for when exposure is proper 62, 64, and 68. 68 is the element of the invention shown in the form of FIG. 4 wherein the operator of a camera can read "OK" when there is sufficient light for a picture. The indicator 62 would be provided with printing not shown to indicate that when "OK" was shown, the picture could be taken. Indicator 64 is for comparison for the low light situations when the indicator of the invention was completely white. The user of the camera would compare the invention indicator of the invention 68, and if the indicia 66 was visible, then know that there is sufficient light to take a picture. If the indicia 66 was not visible, being transparent, then the user of the camera would know there was not enough light to take a picture.

Figure 6:
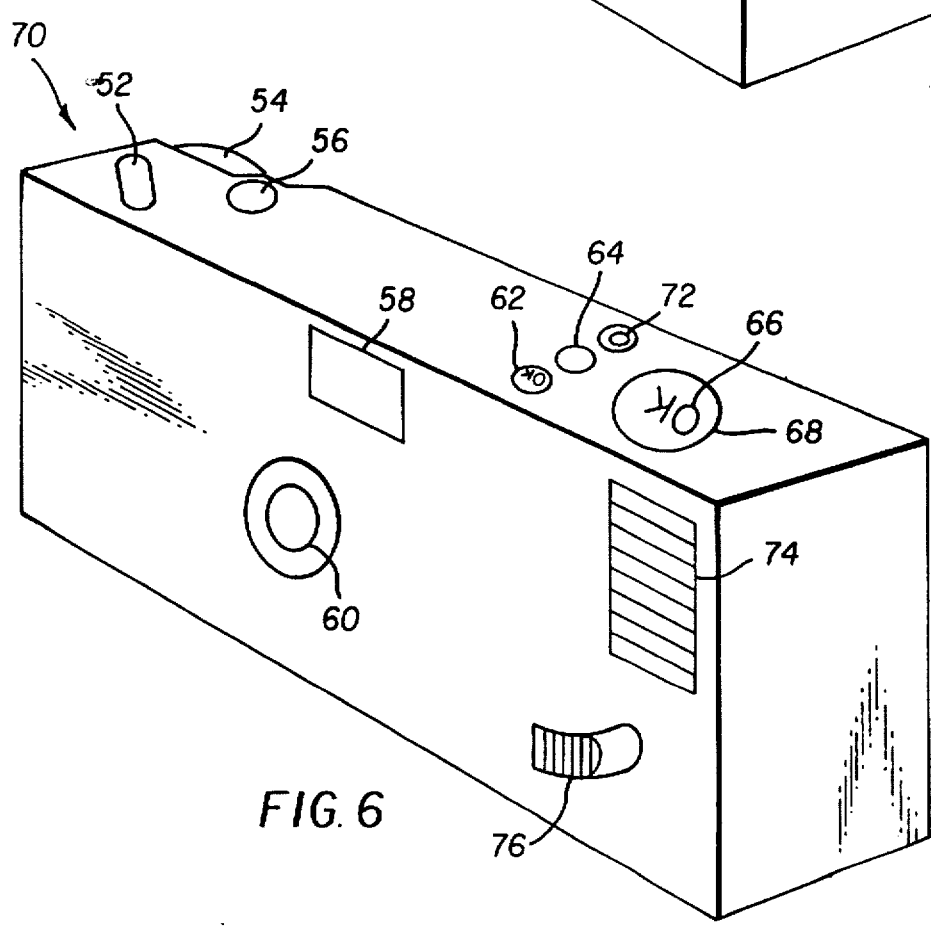
FIG. 6 is a perspective view of a flash camera using an element of the invention.

In FIG. 6 there is illustrated a camera 70. The illustrated camera 70 is a flash camera that is also a single use camera. This camera contains features such as in the camera 50 with the additional requirements of a flash camera. The ready light 72 indicates that the flash 74 is ready to function. The flash charging lever 76 is held until the flash ready light 72 is lit. The indication device 68 of the invention is utilized in the same way with the "OK" 62 having instructions that if the "OK" appears in 68, a flash is not needed. Beside comparison reference 64 will be an instruction that if the indicator 66 is white, then the flash should be used.

The base paper onto which the photochromic compounds of the invention are placed may be any suitable material that will provide a stable support and bind with the hydrophilic colloid layer bearing the photochromic compound. Preferred are materials such as utilized as the base for photographic color papers. These materials are a paper that has been coated with a polyethylene layer on each side. They further generally are provided with a reflective material in either the polyethylene layer 18 or as a separate layer between the gelatin containing layer 14 and the polyethylene coating 18. Typical of the materials used as reflective is titanium dioxide, although other white reflective materials also may be utilized. The use of a reflective base enhances the contrast between the blue of the spironaphthoxazine dyes when they are exposed to ultraviolet light and the white base visible when it is transparent in the dark or low light.

The invention photochromic elements find their preferred use on single use cameras. However, the devices also could be placed on lower priced reusable cameras that were not provided with light sensors that control the exposure. Further, the elements of the invention also would find use in placement on signs at well-known, photographic-taking locations such as overlooks above canyons or in the mountains. Further, there are marked picture taking opportunities in other areas such as amusement parks. In these areas the photochromic elements of the invention could be placed upon signs with instructions indicating that if the spot was white, there was not sufficient light for ordinary photography, and if the indicator device was colored, ordinary photography could be carried out.

Other embodiments of the invention include the offering of the photochromic device of the invention as a retrofitting device for application to cameras that are already in existence. There are a multiplicity of cameras that do not have sensing capability. A device of the invention could be applied as a sticker to these cameras to provide them with the ability to determine when sufficient light was present for picture taking. In another embodiment, photochromic devices of the invention could be printed as indicia rather than utilizing blocking means to form the indicia of the above-described embodiments.

The preferred photochromic compounds of the invention provide rapid changing of color at an amount of illumination suitable for taking pictures with single use cameras. Suitable compounds for the invention include the fulgides, spirooxazines, and spiropyrans. Preferred are the spironaphthoxazines due to excellent fatigue characteristics. The most preferred compounds 5-chloro-1,3-dihydro-1,3,3-trimethylspiro-[2H-indole-2,3'-(3H)naphth(2,1-b)-(1,4) oxazine] and 1,3-dihydro-1,3,3-trimethylspiro-[2H-indole-2,3'-(3H)naphth(2,1 -b)(1,4)oxazine] provide an indication of color change at approximately 45-foot lamberts incident light in the preferred formulations. This is suitable exposure for the typical single use camera which operates at about f/10, using 400 speed film at a shutter of 1/100th of a second. Other photochromic compounds or other formulations could be selected that would undergo a color change at somewhat different light intensity. Alternatively, if it was desired that the preferred compounds be utilized for lower speed film such as 100 speed, filter dyes could be placed above or in dispersion with the spironaphthoxazines of the invention in order to require the higher light intensity for the color change to take place.

The preferred spironaphthoxazines of the invention have been found to, when formulated as a photographic type dispersion, undergo a color change in remarkably rapid rate. It is considered suitable if a change is complete in less than a minute. However, it is preferred that the change be in less than 10 seconds. It is found that the preferred material undergoes substantially complete change in only several seconds when exposed to sunlight. It is noted that the spironaphthoxazines of the invention are sensitive only to ultraviolet radiation and, therefore, do not find practical use for interior indication of suitable tungston light for photography. However, for one time use cameras containing ordinary speed films of 400 ASA, a flash is nearly always required for inside photography and, therefore, the photochromic indicator yields the correct response.

The embodiment of the invention utilizing a layer to block the sunlight from reaching the spironaphthoxazine dye is preferably formed with the use of ultraviolet absorbers, as these materials are transparent. However, it is also possible that filter dyes for sunlight also could be utilized. Such filter dyes are well known from use in photographic negative films. The printing onto the photochromic material of any pattern may be carried out by conventional means such as printing, spray paint, or painting using masks. Ways of printing are well known in the art. The preferred UV absorber compounds are a number of UV blocking inks for example, those containing the Tinuvins of Ciba-Geigy.

Any suitable amount of the photochromic compounds may be utilized in the photochromic elements of the invention. It has been found that with the preferred spironaphthoxazine compound materials, the loading is suitable between about 3 and about 150 milligrams per square foot. A preferred amount is between 10 and 15 milligrams per square foot to provide good color in sunlight and transparency when a low amount of light is present.

This invention in a preferred form involves the use of photochromic materials for a light meter on single use cameras. When incident light levels are sufficient to obtain adequate exposures with the fixed aperture and shutter speed of a single use camera, the light meter changes color, causing a symbol or word to become visible, indicating to the photographer that an acceptable quality photograph will result.

In photochromic materials, two or more chemical species having different absorbance spectra, and thus different colors, exist in equilibrium. In a simple scheme (Equation 1), absorbance of incident light causes one species (A) to be transformed into the other (B) by a photochemical process, resulting in a color change. The second species (B) can revert to the first (A) by either a thermal or photochemical process. For some applications, for example, an intensity meter for lasers, or an optical computer memory device, it is desirable that the reverse reaction (A←B) be accomplished solely by photochemistry. For this invention, it is preferable if the reverse reaction is dominantly or totally a thermal reaction, so that the light induced signal vanishes when the light level decreases to levels insufficient for photography.

In the simple (hypothetical) example (FIG. 1), the properties of the photochromic compound are determined by: the absorbance spectra of both species, the efficiency of the photochemical process, and the thermal rate constant $k_{-1}$. The absorbance spectra describe the wavelength of the light that drives the photochemical reaction, the colors of both species and the color change that results, and (in part) the absorbance density formed by both species. The preferred compounds absorb only UV light, and are thus colorless, in form A, but are intensely colored in form B. The efficiency of the photochemical process contributes to the "intensity" of the color formed, the light level needed to cause the observed color change (sensitivity), and the speed at which the color change occurs upon exposure to sufficient light. The thermal back reaction rate constant $(k_{-1})$ determines how quickly the compound fades when the light source is removed (fade rate), and is a factor in the maximum density obtained. The rate constant depends on the photochromic chemical utilized, and is also highly dependent on the environment of the chemical. For example, the fade rate is much greater when the compound is dissolved in a fluid solvent rather than in a rigid polymeric material, and also depends on the polarity of the medium. The rate constant is strongly dependent on temperature as well, increasing by roughly a factor of three for each 10° C. increase.

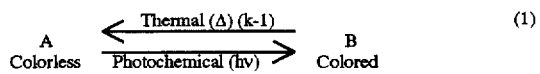

The photochromic material must meet several specifications for this application to be successful. The first is the sensitivity of the material. The color change must occur at the appropriate light level. The density formed by the material must be such as to be easily identified by the camera operator. The formation of color must be rapid, and the fade rate must be fast so that when light levels drop below what is needed for good film exposure, the photographer is informed in a timely fashion. As the fading reaction is a thermal process, it depends on temperature, and the temperature dependence of all the above specifications must also be considered. Finally, the photochromic material must display little or no fatigue, or photodecomposition, effects. Fatigue is the gradual decay of the performance of the photochromic system, as an increasing proportion of the compound is converted to other, dead-end species.

A variety of classes of chemical compounds show the photochromic effect. These include the pyrans, the spiropyrans, the fulgides, the spirooxazines, and other chemical families. The spiropyrans have generally poor performance with regard to fatigue. The preferred inventive compounds are spironaphthoxazines, which give good performance in all areas described. The most preferred spironaphthoxazines of the invention have a composition in accordance with Formula 1.

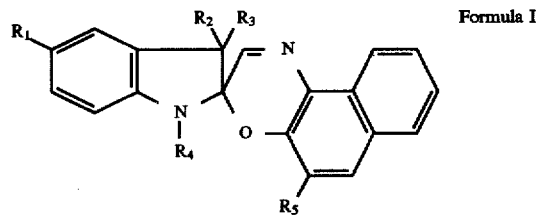

wherein $R_1$ is H, Cl, Br, alkyl, carbomethoxy, methoxy, or trihalomethyl $R_2$ is H or alkyl $R_3$ is H or alkyl $R_4$ is H or alkyl of up to 4 carbons.

$R_5$ is carboxyethyl, cyanopropyl, carboxymethyl, methoxy, or H.

The performance of the photochromic compounds is strongly dependent on their interactions with the materials in which they are dissolved/dispersed. The photochromic compounds react most rapidly when formulated in fluid solutions, and very slowly or not at all in a crystalline state. When they are dissolved in more rigid matrices, the photochromic effect is slowed appreciably, as the structural changes which occur with the photochemical reaction (A⇌B) are restricted. The prior art for placing these compounds in rigid polymers for uses such as eyeglass lenses is well known. However, a much more rapid reaction is required for a photochromic light meter for photographic use. Simple solutions and very flexible polymers give good kinetic characteristics, but are difficult to implement, requiring leak proof packaging. In the invention a highly desirable implementation is to include the photochromic compound in a hydrophilic colloid photographic type dispersion. The compound is dissolved in an organic solvent, and then dispersed into an aqueous phase. The aqueous phase of the dispersions of the photochromic elements may comprise a hydrophilic colloid. This may be gelatin or a modified gelatin such as acetylated gelatin, phthalated gelatin, oxidized gelatin, etc. The hydrophilic colloid may be another water-soluble polymer or copolymer including, but not limited to, poly(vinyl alcohol), partially hydrolyzed poly (vinylacetate/vinylalcohol), hydroxyethyl cellulose, poly (acrylic acid), poly(1-vinylpyrrolidone), poly(sodium styrene sulfonate), poly(2-acrylamido-2-methane sulfonic acid), and polyacrylamide. Copolymers of these polymers with hydrophobic monomers may also be used.

Photochromic compounds may be dissolved in high-boiling or permanent solvents. Optionally, auxiliary solvents may be used to assist dissolution of the photochromic compound in the permanent solvent. The auxiliary solvent, if present, is then removed by evaporation, washing, or dialysis. Examples of solvents which may be used include the following:

| | |
|---|---|
| Tritolyl phosphate | S-1 |
| Dibutyl phthalate | S-2 |
| N,N-Diethyldodecanamide | S-3 |
| N,N-Dibutyldodecanamide | S-4 |
| Tris(2-ethylhexyl)phosphate | S-5 |
| Acetyl tributyl citrate | S-6 |
| 2,4-Di-tert-pentylphenol | S-7 |
| 2-(2-Butoxyethoxyl)ethyl acetate | S-8 |
| 1,4-Cyclohexyldimethylene bis(2-ethylhexanoate) | S-9 |
| Ethyl acetate | S-10 |

This photographic type dispersion can be then coated in a thin layer on (photographic) paper, chilled to set the hydrophilic colloid, dried, and hardened by chemical cross-linking of the gelatin. Various types of hardeners can be used in the photographic element. In particular, bis(vinylsulphonyl) methane, bis(vinylsulfonyl) methyl ether, 1,2-bis (vinylsulfonylacetamido) ethane, 2,4-dichloro-6-hydroxy-s-triazine, triacryloyl-triazine, and pyridinium, 1-(4-morpholinylcarbonyl)-4-(2-sulfoethyl)-, inner salt are particularly useful. Also useful are so-called fast acting hardeners as disclosed in U.S. Pat. Nos. 4,418,142, 4,618,573, 4,673,632, 4,863,841, 4,877,724, 5,009,990, and 5,236,822.

The resulting sheets are very convenient to handle, and implement into a product by cutting, printing on, placing adhesive onto back, or other operations. The photochromic performance of the coated sheets is excellent, with very rapid kinetics, as the photochromic compound is effectively in solution, in small droplets of organic solvent still dispersed in the hardened coatings. Details of the procedure and resulting photochromic characteristics are given below.

The following examples illustrate the practice of this invention. They are not intended to be exhaustive of all possible variations of the invention. Parts and percentages are by weight unless otherwise indicated.

EXAMPLES

The dispersion of the photochromic compound is made according to Table 1. The photochromic compound, the coupler solvent, and auxiliary coupler solvent are mixed at 50° C. with stirring (part 1), and the gel, surfactant, and water are melted, also at 50° C., in a separate container (part 2). The two parts are combined and passed through a colloid mill five times. The resultant mixture is rotovapped to remove the volatile, auxiliary solvent (ethyl acetate) and an equal mass of deionized water is added in its place. The finished dispersion can be melted and mixed with desired amounts of water, gelatin, hardener and surfactants, and coated at varying thicknesses to obtain desired properties.

The dispersion is coated on a photographic paper base. The material coats the paper base well and does not separate from the base. The paper base is very white, containing $TiO_2$, showing excellent contrast between the blue signal produced with sufficient sunlight and the lack of color at low light levels. As the coating is in optical contact with the paper base, the light entering the front surface of the photochromic coating reflects off the paper and must make at least two (and often many more) passes through the photochromic layer. This increases the efficiency of absorbance of UV light to trigger the color change, and also increases the visible density of the color produced.

TABLE 1

| Preparation of Dispersion of Photochromic Compound. |
|---|
| Part 1 |
| Mix at 50° C. |
| 2% Aldrich 32254-7 |
| 1,3-Dihydro-1,3,3-trimethylspiro[2H-indole-2,3'-[3H]napth[2,1-b] [1,4]oxazine] |
| 4% N,N-Diethyldodecanamide |
| 6% Ethyl Acetate |
| Part 2 |
| Combine and |
| melt at 50° C. |
| 6% Gelatin |
| 0.6% Surfactant (Alkanol) |
| Balance Deionized Water |

The dispersion sample described above is coated on photographic paper at about 15 mg/ft$^2$ (1.4 mg/m$^2$) of the photochromic compound. Upon exposure of the coating to incident sunlight, the sample turns from white (the color of the photographic paper base) to blue, with a visible density of 0.4 at 75° F. in bright sunlight. The color change is apparent at about 40–50 fL incident light level which corresponds well with giving a correct exposure on certain single use cameras. Upon removal of the light source, the coating fades completely in less than 10 seconds. Measurement shows that the density fades to 10% of its light induced density in 7 seconds after removal of the light source. The same material takes 10 times as long to fade when dispersed in an acetate polymer film, and other compounds such as 1',3'-Dimethyl-6-nitro-3'-phenylspiro-[2H-1-benzopyran-2, 2'-indoline] can take up to ~1000 times as long to fade to 10% of former density.

The example also shows very good fatigue properties. After being exposed to bright sunshine for over 8 hours, the fade kinetics and the incident exposure required to produce a visible signal were unchanged.

The sample above was overprinted with a UV blocking ink, containing Tinuvin 1130 and Tinuvin 292 of Ciba-Geigy in a 2:1 ratio, placed into an aqueous primer coating at 3% loading. The printing was accomplished by silk screening desired patterns over the described dispersion coating. When exposed to sunlight, the areas where the ink was printed remained white, while the unprinted areas rapidly turned a distinct blue, clearly forming the desired symbol or letters, telling the photographer sufficient light is present to obtain a quality photograph.

The invention has been described in detail with particular reference to preferred embodiments thereof, but it will be understood that variations and modifications can be effected within the spirit and scope of the invention.

We claim:

1. A light sensitive device comprising a base material and a layer of photochromic chemical dispersed in hydrophilic colloid wherein said device has a pattern of ultraviolet light absorbing material overlaying a portion of said layer of photochromic chemical wherein said ultraviolet absorbing material is in said pattern such that when said device is in sunlight photochromic material not overlayed by said ultraviolet light absorbing material is dark and photochromic material overlayed by the ultraviolet absorbing material is transparent.

2. The light sensing device of claim 1 wherein said hydrophilic colloid comprises gelatin.

3. The light sensing device of claim 1 wherein said photochromic chemical comprises spironaphthoxazine.

4. The light sensing device of claim 3 wherein said spironaphthoxazine has a composition in accordance with Formula I

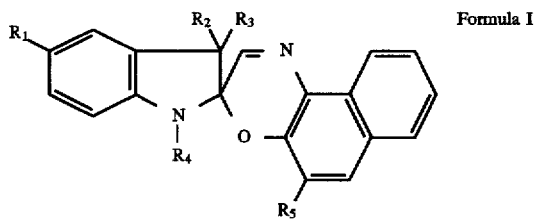

Formula I wherein $R_1$ is H, Cl, Br, alkyl, carbomethoxy, methoxy, or trihalomethyl $R_2$ is H or alkyl $R_3$ is H or alkyl $R_4$ is H or alkyl of up to 4 carbons $R_5$ is carboxyethyl, cyanopropyl, carboxymethyl, methoxy, or H.

5. The device of claim 3 wherein said layer with dispersed spironaphthoxaine is generally transparent except when exposed to sufficient light to allow photographs without flash illumination.

6. The device of claim 3 wherein said spironaphthoxazines is selected from the group consisting of 5-chloro-1,3-dihydro-1,3,3-trimethyl-spiro[2H-indole-2,3'-(3H)naphth(2,1-b)-(1,4)oxazine] and 1,3-dihydro-1,3,3-trimethylspiro-[2H-indole-2,3'-(3H)naphth(2,1-b)-(1,4)oxazine].

7. The device of claim 1 wherein said photochromic chemical is selected from the group consisting of fulgides, spiroxazines, and spiropyrans.

8. The device of claim 1 wherein said base material has a reflective coating thereon.

9. The device of claim 8 wherein said base material comprises a resin coated paper.

10. The device of claim 8 further comprising a protective layer over a layer of gelatin and photochromic spironaphthoxazine.

11. The device of claim 10 wherein said layer of gelatin with spironaphthoxazine can change from colored to generally clear in less than 1 minute.

12. The device of claim 8 further comprising indicia on said base.

13. The device of claim 1 wherein said base has an adhesive coating layer on the opposite side of said base material from said layer comprising hydrophilic colloid.

14. The device of claim 1 wherein said photochromic chemical is printed in a pattern.

15. A single use camera comprising a light sensitive device comprising a base material and a layer of photochromic chemical dispersed in hydrophilic colloid wherein said device has an ultraviolet light absorbing material overlaying at least a portion of said photochromic chemical.

16. The camera of claim 15 wherein said hydrophilic colloid comprises gelatin.

17. The camera of claim 16 wherein said base material comprises paper and said device further comprises an adhesive coating on the opposite side of said paper from said layer of gelatin.

18. The camera of claim 15 wherein said photochromic chemical comprises spironaphthoxazine.

19. The camera of claim 18 wherein said spironaphthoxazine has a composition in according with Formula I

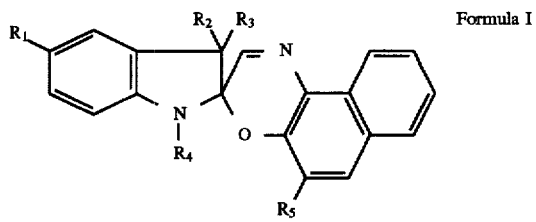

Formula I wherein $R_1$ is H, Cl, Br, alkyl, carbomethoxy, methoxy, or trihalomethyl $R_2$ is H or alkyl $R_3$ is H or alkyl $R_4$ is H or alkyl of up to 4 carbons.

$R_5$ is carboxyethyl, cyanopropyl, carboxymethyl, methoxy, or H.

20. The camera of claim 18 wherein said layer with dispersed spironaphthoxazines is generally transparent except when exposed to sufficient light to allow photographs without flash illumination.

21. The camera of claim 18 wherein said photochromic layer comprising gelatin with spironaphthoxazine can change from colored to generally clear in several seconds.

22. The camera of claim 18 wherein said spironaphthoxazine is selected from the group consisting of 5-chloro-1,3-dihydro-1,3,3-trimethylspiro-[2H-indole-2,3'-(3H)naphth-(2,1-b)-(1,4)oxazine] and 1,3-dihydro-1,3,3-trimethylspiro-[2H-indole-2,3'-(3H)naphth(2,1 -b)-(1,4)oxazine].

23. The camera of claim 15 wherein said base material comprises a reflective coating.

24. The camera of claim 15 wherein said base material further comprises a resin coated paper.

25. The camera of claim 15 further comprising indicia on said base.

26. The camera of claim 17 wherein said photochromic chemical is printed in a pattern.

27. A light sensitive device comprising
a base material,
a layer of photochromic chemical dispersed in a hydrophilic colloid on said base material, and
a layer comprising an ultraviolet light absorbing material partially overlaying said layer of photochromic chemical, and wherein said ultraviolet material is in pattern wherein said ultraviolet absorbing material is in said pattern such that when said device is in sunlight, photochromic material not overlayed by said ultraviolet light absorbing material is dark and photochromic material overlayed by the ultraviolet absorbing material is transparent.

28. The light sensing device of claim 27 wherein said photochromic chemical comprises spironaphthoxazine.

29. The light sensing device of claim 27 wherein said photochromic chemical comprises spironaphthoxazine that has a composition in accordance with Formula I

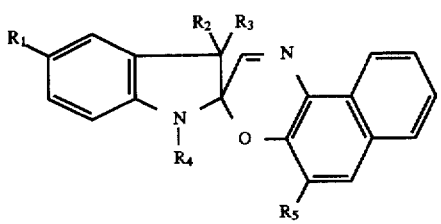

Formula I wherein

R₁ is H, Cl, Br, alkyl, carbomethoxy, methoxy, or trihalomethyl

R₂ is H or alkyl

R₃ is H or alkyl

R₄ is H or alkyl of up to 4 carbons

R₅ is carboxyethyl, cyanopropyl, carboxymethyl, methoxy, or H.

30. The device of claim 27 wherein said photochromic material is spironaphthoxazine and said layer with dispersed spironaphthoxazine is generally transparent except when exposed to sufficient light to allow photographs without flash illumination.

* * * * *